May 31, 1938.   L. A. BAUMANN   2,119,501
APPARATUS FOR MEASURING FOREIGN MATTER PRESENT IN LIQUIDS
Filed Jan. 22, 1936   2 Sheets-Sheet 1

INVENTOR.
Lewis A. Baumann
BY
ATTORNEYS

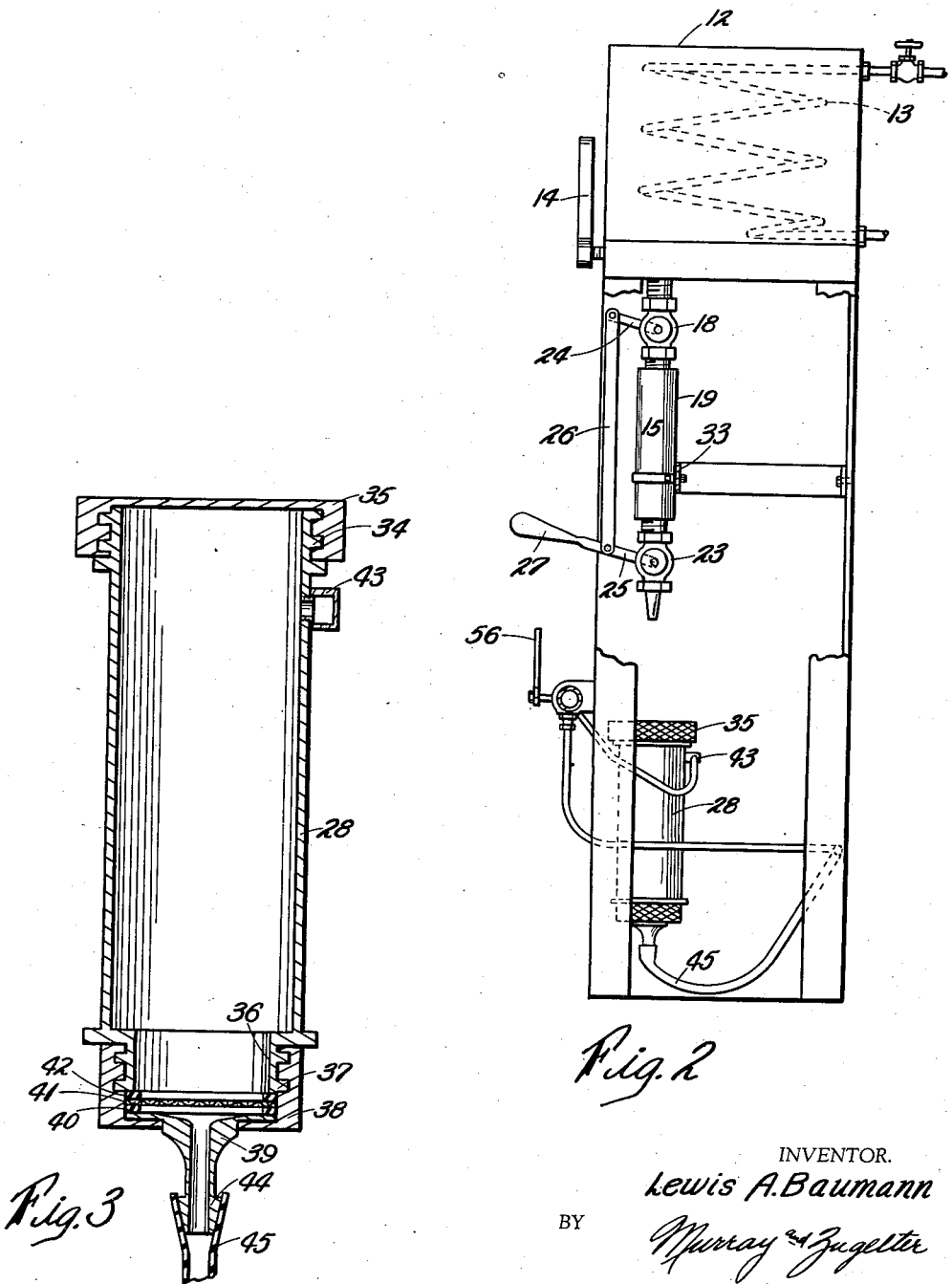

Patented May 31, 1938

2,119,501

UNITED STATES PATENT OFFICE 2,119,501

APPARATUS FOR MEASURING FOREIGN MATTER PRESENT IN LIQUIDS

Lewis A. Baumann, Fort Thomas, Ky., assignor to French Bauer Incorporated, Cincinnati, Ohio, a corporation of Ohio Application January 22, 1936, Serial No. 60,283

3 Claims. (Cl. 73—51)

The present invention relates to apparatus for separating out foreign matter in liquids such as cream, and has for an object the provision of a simple and easily operated device for quickly and accurately effecting the desired operation of conditioning and extracting and collecting from such liquids the foreign content which, in the case of cream from the farm, constitutes one of the factors governing acceptance or rejection of the product by the large dairy plants.

Another object of the invention is to provide apparatus of this kind that is easily kept clean and which requires a minimum of time and attention by an operator in the use thereof, so that shipments of cream received at the dairy plant are quickly sampled and placed in condition for the attention of the chemist and inspector at the plant.

These and other objects are attained by the means described herein and disclosed in the accompanying drawings, in which:

Fig. 2 is a view taken on line 2—2 of Fig. 1.

Fig. 3 is a cross-sectional view taken on line 3—3 of Fig. 1.

Figure 1:
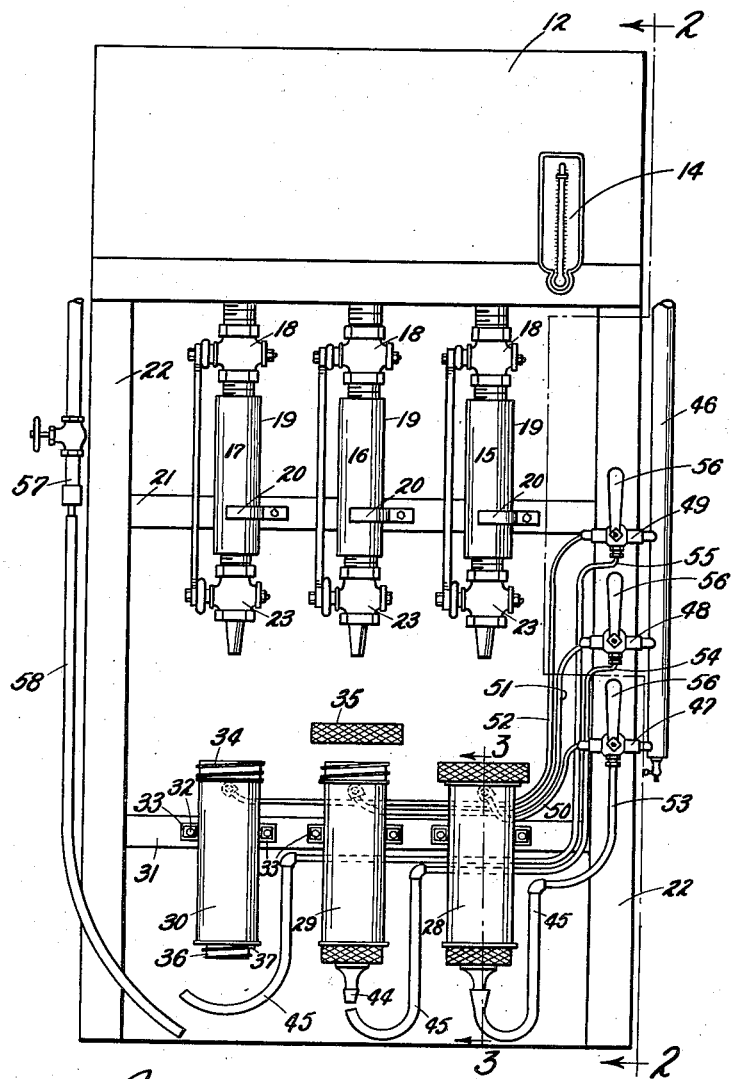
Fig. 1 is a front elevational view of the apparatus of the invention.

In dairy plants, the examination of samples of cream entails a series of operations in preparing the samples or contents thereof for the expert attention of chemists, bacteriologists and inspectors, these operations and examinations being necessary to the determination of acceptability of the shipment for distribution or processing. One index of acceptability of cream from the farm is the amount of and nature of foreign content of the cream.

Heretofore, the practice of conditioning a sample of cream so that the foreign and particularly the solid particle foreign content of cream could be separated therefrom has been carried on by a series of steps that were slow and time-taking, so that progress of the produce through the plant was oftentimes delayed due to the time-consuming operation of separating foreign matter from cream samples as a preliminary step to acceptance of shipments.

By means of the apparatus of the present invention these preliminary steps are made quickly and semi-automatically so that the operator charged with the duty of preparing samples can keep a series of operations constantly under way and thus pass on the results thereof more quickly and in great numbers when necessary.

The whole cream sample of given quantity cannot be passed through a filter or strainer member of sufficiently fine mesh to separate the minimum permissible size of foreign particles without first mixing therewith a suitable diluent of a nature that will produce a necessary consistency and condition of the material to be tested. The diluent liquid medium is desirably a hot water solution that is either slightly acid or slightly alkaline. Since the apparatus is made up largely of metal parts and rubber tubing, it is desirable to utilize a hot dilute water solution containing sodium bicarbonate in the apparatus although other solutions, preferably of alkaline nature, may be used.

The apparatus comprises generally a means to hold a supply of the hot diluent liquid, a series of open ended containers in which the cream samples are placed, diluted and agitated with the solution to homogeneous filterable consistency, means to dispense measured quantities of the solution into the containers, means to agitate and mix or homogenize the cream and said solution, means to hold a filter member on each container and pressure means to force the mixture through the filter member which can thereafter be removed with the collected foreign matter thereon and placed in a suitably identified transparent envelope for the attention of those charged with the duty of interpreting the results.

Referring to the drawings, the apparatus may be conveniently constructed with an elevated tank 12 for containing a diluent solution, such as water and sodium bicarbonate, which solution is kept hot by means of steam coil 13 in the tank. The tank is desirably provided with a conveniently located thermometer 14, so that the temperature of the contents may be readily checked and regulated when necessary.

Disposed below tank 12 are spaced apart measuring and dispensing devices in any suitable number such as the devices indicated at 15, 16 and 17 which are suitably connected with tank 12 and each of which may comprise a filling valve 18, directly or otherwise connected with said tank, a measuring chamber 19, which is conveniently connected with valve 18, and supported as by a clamp 20 on a cross member 21 forming part of the support 22 for said tank, and a discharge valve 23 connected to the lower end of measuring chamber 19. The operating levers 24 and 25 of valves 18 and 23 respectively, are arranged in parallelism and are connected by a link 26 so that by operating the extended handle 27 on valve lever 25, the upper and lower valves are simultaneously actuated. The valves are arranged so that when valve 23 is closed, the valve 18 opens, thus automatically filling the measuring chamber 19 with hot solution from tank 12. Upon opening of valve 23 to discharge the contents of chamber 19, the valve 18 is simultaneously closed to cut off the supply of solution between the tank and measuring chamber. Any other suitable measuring and dispensing valve may be employed in lieu of the one described if desired.

Beneath the measuring and dispensing devices 15, 16 and 17 respectively, are mounted mixing and pressure filter chambers 28, 29 and 30, these chambers being conveniently supported upon a cross member 31 with bolts 32 which pass through lugs 33 on the chambers. As can be best seen in Fig. 1, the chamber such as 30 has at its top an exterior course or rapid thread 34 adapted to receive a correspondingly threaded closing cap 35 which is peripherally journalled or notched to facilitate quick application and detachment from the cylinder. The bottom of each chamber or cylinder has a slightly restricted and shouldered portion 36 which also has an exterior coarse or rapid thread 37 adapted to receive a correspondingly internally threaded annular shouldered cap 38. A flanged nipple 39 is adapted to seat within the flanged portion of cap 38 and to have superposed thereon a gasket 40, a removable filter member such as a disc of muslin or the like 41 and a second gasket 42 which upon securely fitting the assembly upon the exteriorly threaded end 36 of the cylinder forms a closure for the bottom of the cylinder.

Adjacent the top and preferably to the rear of each cylinder is a coupling 43 whereby air under pressure may be admitted to the top portion of the chamber. The nipple 39 has the end 44 thereof tapered and adapted for the ready attachment and detachment of a rubber tube 45.

The assembly thus far described is adapted to be suitably mounted upon a bench or standard such that an operator may conveniently reach the top and bottom and closing caps of the mixing chamber, the several hoses and the handles 27 of the measuring and dispensing valves.

A filtered air pressure supply line 46 is conveniently mounted slightly to one side of the assembly described and attached thereto are a series of three-way control valves 47, 48 and 49 having outlets connected respectively with pressure lines 50, 51 and 52 connecting with the nipples 43 of cylinders 28, 29 and 30. These valves 47, 48 and 49 each have additional outlets connected with pressure lines 53, 54, and 55 respectively to the ends of which are connected the rubber tubes 45 which, as previously explained, are readily applied to and detached from the ends 44 of the nipples for cylinders 28, 29 and 30. By turning the operating handles 56 for the air pressure valves to selected positions the air pressure to any given cylinder is completely cut off, or directed through the remaining pressure tube such as 53, 54 or 55 to the associated rubber tube for application through nipple 39 to the bottom of the mixing and filter chamber cylinder. The apparatus is furthermore desirably provided with a valve controlled hot water line 57 having a convenient length of flexible hose 58 thereon for the purpose of cleansing the mixing and filter chambers after each operation and also for convenient use in replenishing the water supply to tank 12 and for flushing away the waste material from the sink or drain (not illustrated) but which is desirably provided beneath the battery of mixing and filter chambers.

From the following description of the operation of the apparatus, it will be readily appreciated that the means of the present invention affords the operator an opportunity to pursue the several steps of separating foreign matter from cream samples in a semi-automatic fashion and with greater speed and accuracy than with the heretofore followed practice of manually executing the various steps of measuring, mixing, agitating, filtering and cleaning.

In operating the device, the operator receives in individual and properly identified containers, measured sample quantities of cream extracted from each lot of each shipment. After assuring that the mixing chambers 28, 29 and 30 have been flushed and cleaned by using the hot water supply from hose 58, the operator places a clean sterile muslin disc 41 between the pair of gaskets 40 and 42 and, after seating nipple 39 in annular cap 38 quickly screws the entire assembly tightly on the bottom of a cylinder such as 28. A cream sample is then selected and poured into the open top of cylinder 28 and the identified container placed adjacent thereto for maintaining the identity of the content of the cylinder. Lever 27 of measuring and dispensing valve 15 is then actuated to close valve 23 and open valve 18 to fill measuring chamber 15 with the hot alkaline solution from tank 12. Operating lever 27 is then reversely moved effecting simultaneous closing of valve 18 and opening of valve 23 which discharges the hot alkaline solution into the sample of cream. The cream at its normal consistency will not pass through the filter disc 41. Hose 45 having been first attached to nipple 39, valve 47 is actuated to supply agitating air through hose 45 and upwardly through the filter to bubble through and effect a stirring and thorough mixing of the cream and diluent solution. While this operation is in process, the operator conditions the next mixing and filter chamber in the manner just described and initiates the mixing and homogenizing of the cream and hot diluent solution therein. The same operations are then carried on with successive mixing chambers, using successive samples to be tested. By the time several additional samples are conditioned and undergoing agitation and homogenization, the first sample is thoroughly mixed whereupon valve 47 is momentarily shut off and cap 35 is quickly and tightly screwed in place thus sealing the top of cylinder 28. Valve 47 is then actuated to direct pressure air through tube 50 to the upper portion of the now closed cylinder, and hose 45 is simultaneously removed whereupon the pressure now forces the completely homogenized diluted mixture of cream and hot diluent solution through the filter disc 41, the escaping waste mixture being allowed to run into a sink or waste container. Similar operations are progressively performed on the succeeding units of the apparatus so that an operator is enabled to continuously keep a number of the units in operation with the successive steps and operations in successive units overlapping chronologically. When cylinder 28 is completely empty, the annular cap 38 is removed and the filter disc 41 which now has on one face thereof a completely segregated mass of foreign material that was contained in the cream sample, is now disposed forthwith into a suitable transparent envelope which is identified with the cream sample so that this foreign material may be submitted to the proper inspection by trained experts who determine from the nature and amount of the foreign material whether or not the lot represented by the sample is acceptable for any purpose or is to be completely rejected.

The novelty and advantage of the present invention over previously pursued methods of separating foreign materials from cream samples lies particularly in the alternate application of pressure air from a constant pressure source to the top and bottom of the mixing and filter chamber, whereby the several operations are carried out automatically and release the operator's time to preceding and succeeding steps of the process with other units of the device.

The invention herein will be understood to be subject to modification as to structural details, and is to be understood as limited only by the scope of the appended claims.

The example given herein deals with the separation of foreign particle content from cream samples. Oils and other substances of a consistency such that foreign particles are not readily separable therefrom may be handled by comparable method and apparatus. It will be understood the use of suitable diluents and/or heat will be governed by the nature of the substance and that the variation of pressure utilized in carrying out the necessary steps may be accomplished by the use of any suitable gaseous medium, e. g. steam pressure or say by air or other gaseous suction instead of gaseous pressure, so long as the means used is itself free of harmfully contaminant matter that would preclude an accurate analysis of the separated foreign matter sought.

What is claimed is:

1. Apparatus of the class described comprising a supply tank for hot diluent liquid, a measuring and dispensing valve connected with said tank, a vertical chamber member open at both ends and adapted to receive liquid discharged from the measuring and dispensing valve, a nipple and filter disc adapted to be secured to the bottom of said chamber, an annular cap for detachably mounting said nipple and filter disc on the chamber, a detachable closing cap for the top of the chamber, a constant source of gaseous pressure, valve means for said gaseous pressure, a tube connected with said valve means and with a point adjacent the top of the chamber, a controlled gaseous pressure tube connected to a source and a quick detachable connection for said nipple and the last-mentioned tube.

2. In an apparatus of the class described, the combination of a source of diluent solution, a measuring and dispensing valve connected with said source, an open ended cylinder mounted for receiving discharge of the measuring and dispensing valve, a filter disc, means for removably mounting the filter disc over the lower end of the cylinder, a removable closing cap for the top of the cylinder and means to effect movement of a gaseous medium through the cylinder selectively in opposite directions.

3. In an apparatus of the class described a chamber member for receiving a quantity of liquid to be filtered, and having at opposite ends a closable filling opening and a discharge opening, means including a removable filter member for covering the discharge opening, and means to effect gaseous pressure flow selectively through the filter into the chamber and reversely through said chamber and filter.

LEWIS A. BAUMANN.